United States Patent [19]

Lindner et al.

[11] 4,138,393

[45] Feb. 6, 1979

[54] CROSSLINKABLE ACRYLONITRILE COPOLYMERS

[75] Inventors: Christian Lindner, Cologne; Carlhans Süling, Odenthal; Günter Arend, Dormagen; Dieter Brokmeier, Dormagen; Günther Nischk, Dormagen, all of Germany

[73] Assignee: Bayer Aktiengesellschaft, Leverkusen, Fed. Rep. of Germany

[21] Appl. No.: 804,856

[22] Filed: Jun. 8, 1977

[30] Foreign Application Priority Data

Jun. 11, 1976 [DE] Fed. Rep. of Germany ....... 2626174

[51] Int. Cl.² .......................... C08G 2/00; C08G 2/26; C08F 22/20
[52] U.S. Cl. .............................. 526/287; 260/32.6 R; 526/229; 526/316
[58] Field of Search ............................ 260/63 UY, 66

[56] References Cited

U.S. PATENT DOCUMENTS

| | | | |
|---|---|---|---|
| 2,536,980 | 1/1951 | Jones | 260/66 |
| 3,345,336 | 10/1967 | Kuhlkamp et al. | 260/53 UY |
| 3,542,855 | 11/1970 | Moschel et al. | 260/66 |

*Primary Examiner*—Herbert J. Lilling
*Attorney, Agent, or Firm*—Plumley and Tyner

[57] ABSTRACT

The invention relates to a copolymer comprising at least 40% by weight of copolymerized acrylonitrile and from 0.5 to 10% by weight of at least one copolymerized unsaturated ester of acetoacetic acid corresponding to the general formula:

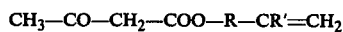

and, optionally, at least one other copolymerized comonomer.

3 Claims, No Drawings

CROSSLINKABLE ACRYLONITRILE COPOLYMERS

This invention relates to crosslinkable acrylonitrile-containing copolymers which contain at least one copolymerised unsaturated ester of acetoacetic acid as their crosslinkable component.

Polyacrylonitrile and copolymers of acrylonitrile with other monomers are excellent fibre-forming polymers. It is known that acrylic fibers show only moderate dimensional stability under conditions of elevated temperature and relatively high humidity. Under conditions such as these, utility articles often show inadequate stitch elasticity, no laundry stability in regard to ironed-in creases and a tendency towards creasing and bagging when washed in hot water. It is known that an improvement in dimensional stability can be obtained by starting from fibres with a crosslinked structure. According to published Japanese Patent Application No. 43, 82768, fibres such as these can be obtained by polymerising a monomer mixture of acrylonitrile and the N-methylol compound of an unsaturated amide in an aqueous zinc chloride solution, spinning the solution of the polymers and carrying out crosslinking on the filaments thus obtained.

According to an earlier proposal acrylonitrile is copolymerised with a polymerisable unsaturated carboxylic acid amide and an alkyl ether of an N-methylol compound of an unsaturated polymerisable acid amide. The materials, such as filaments and films, produced from copolymers such as these can be crosslinked by heating.

According to another earlier proposal N-methylol compounds of unsaturated copolymerisable urethanes or bis-urethanes are copolymerised with acrylonitrile. Shaped articles produced from copolymers of this kind can be crosslinked by heating.

Although excellent crosslinked shaped articles, more especially filaments and fibres, can be produced from these polymers, the polymers are still in need of improvement because difficulties are involved in controllably crosslinking the copolymer under defined conditions.

It has now been found that copolymers of acrylonitrile and copolymerised unsaturated esters of acetoacetic acid show improved properties in regard to controllable and reproducible crosslinking.

Accordingly, the present invention relates to a copolymer comprising at least 40 % by weight of copolymerised acrylonitrile and from 0.5 to 10 % by weight of at least one copolymerised unsaturated ester of acetoacetic acid corresponding to the general formula:

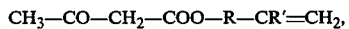

in which
R represents an alkylene radical with from 1 to 4 carbon atoms, and
R' represents a hydrogen atom, an alkyl radical with 1 or 2 carbon atoms or the radical

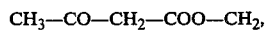

and optionally at least one other copolymerised comonomer.

The invention also relates to a process for producing copolymers with the composition defined above.

Finally, the invention relates to the use of polymers with the composition defined above for the production of filaments, fibres and films.

The unsaturated acetoacetic acid esters may be produced by the methods described in GB-PS No. 1,218,509 and GB-PS No. 1,144,486.

To this end, an unsaturated alcohol corresponding to the general formula

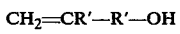

is reacted with diketene or is transesterified with acetoacetic acid ester in the presence of a metal alcoholate as catalyst.

Suitable unsaturated acetoacetic acid esters are, in particular, acetoacetic acid allyl ester, acetoacetic acid methallyl ester and 2-methylidene-1,3-propane diol-bis-acetoacetate, among which the latter is particularly preferred.

Other comonomers which may optionally be used in addition to the olefinically unsaturated esters of acetoacetic acid are, preferably, acrylic acid and methacrylic acid alkyl esters such as, for example, (meth)acrylic acid methyl ester and (meth)acrylic acid ethyl ester. Monomers such as these are preferably copolymerised in quantities of up to 10 % by weight based on the total monomer content. The usual dye-receptive additives such as, for example, unsaturated sulphonic acids, preferably methallyl sulphonic acid, vinyl sulphonic acid or styrene sulphonic acid and their alkali metal salts, may also be copolymerised in quantities of up to about 3 % by weight. In cases where halogen-containing comonomers are copolymerised to improve fire resistance, they are best used in quantities of from 10 to 30 % by weight.

The copolymers according to the invention may be produced by the usual polymerisation processes, for example by solution polymerisation, dispersion polymerisation or suspension polymerisation. Polymerisation is preferably carried out in a precipitant or suspending agent, preferably water. To this end, from 0.5 to 10 % by weight and preferably from 0.5 to 7 % by weight of at least one olefinically unsaturated acetoacetic acid ester corresponding to the above general formula, preferably acetoacetic acid allyl ester or 2-methylidene-1,3-propane diol-bis-acetoacetate, and preferably at least one other comonomer, are polymerised together with at least 40 % by weight and preferably with at least 80 % by weight of acrylonitrile. The polymerisation initiators used are generally the known redox systems, preferably potassium, sodium or ammonium peroxodisulphate/potassium or sodium bisulphite, the ratio by weight of the two components of the initiator system amounting to between 8 : 1 and 1 : 8 and the absolute quantity of initiator system amounting to between 0.5 and 6 % by weight, based on the total quantity of monomer. Polymerisation is best carried out at a pH-value of from 6 to 2, preferably from 2.5 to 4.5, and at a temperature of from about 30° C to 70° C and preferably at a temperature of from 50° C to 60° C.

After a polymerisation time of about 3 to 10 hours, preferably 4 to 7 hours, the polymer is isolated in the usual way by filtration under suction, precipitation or concentration of the solvent. The polymer is then dried for 5 to 15 hours at 30° to 80° C.

By using the olefinically unsaturated copolymerisable esters of acetoacetic acid, it is possible to incorporate into a copolymer reactive 1,3-dicarbonyl groups with active methylene groups which are known to be able to enter into numerous reactions, such as crosslinking reactions. Copolymers such as these may be crosslinked, for example, by formaldehyde, alkyl- or arylaldehydes, alkyl- or aryldialdehydes, aliphatic ketones, N-methylol compounds, N-alkylol ethers urotropin or barbituric acid treated with formaldehyde, condensates of urea and formaldehyde, hexamethylol melamine, the sodium salt of hydroxymethyl sulphinic acid in accordance with BE-PS No. 663,480, or by dihydrazides of dicarboxylic acids in accordance with US-PS No. 3,345,336 or by tris-aziridinyl-1-phosphine oxides in accordance with DAS No. 1,495,797.

These substances crosslink the copolymers according to the invention, for example by adding a crosslinking agent to a solution of the copolymer and inducing crosslinking by heating, by the addition of acid or, optionally, bases. It is also possible to carry out crosslinking on polymeric shaped articles, preferably filaments or films, which contain small amounts of crosslinking agent. It is also possible to crosslink filaments or films of the acrylonitrile copolymers according to the invention by treatment with a crosslinking agent, optionally under heat or in the presence of an acid or base.

The advantage of crosslinking the acrylonitrile copolymers according to the invention by this method is that it is possible, by virtue of the numerous crosslinking possibilities afforded by the use of a variety of different crosslinking agents and by the effects of temperature and also by acid/base catalysis, to carry out crosslinking controllably and reproducibly at certain stages of a textile processing cycle.

The new copolymers are eminently suitable for the production of filaments, fibres and films with excellent mechanical properties. Although it is possible in principle to vary the molecular weights of the polymers according to the invention within wide limits by known methods, polymers with K-values of from about 70 to 90 are particularly suitable for the production of filaments and fibres. The K-values quoted in the following Examples were measured on 0.5 % solutions of the polymers in dimethyl formamide at 25° C.

The quantities quoted in the following Examples, which are to further illustrate the invention without limiting it, are solely parts by weight or percent by weight.

EXAMPLE 1

A mixture of 1600 parts by water, 114 parts of acrylonitrile and 6 parts of acetoacetic acid allyl ester is adjusted with sulphuric acid to pH 2.5 at a temperature of 50° C. Polymerisation is initiated by the addition of 0.6 parts of potassium peroxodisulphate and 3.6 parts of sodium metabisulphite. Polymerisation time: 7 hours at 50° C. Yield: 90 parts (75 %). K-value : 83.2.

EXAMPLE 2

Example 1 is repeated with the following quantities:
117.6 parts of acrylonitrile
2.4 parts of acetoacetic acid allyl ester
1600.0 parts of water
0.65 parts of potassium peroxodisulphate
3.9 parts of sodium metabisulphite
Yield: 58 %
K-value : 70.

EXAMPLE 3

133 parts of acrylonitrile and 7 parts of 2-methylidene-1,3-propane diol-bis-acetoacetate are added at 50° C to 1860 parts of water purged with nitrogen, and the resulting solution is adjusted with sulphuric acid to pH 3.0. Polymerisation is initiated by the addition of 1.0 part of potassium peroxodisulphate and 3.2 parts of sodium metabisulphite. Reaction time: 6 hours. Yield: 68 %. K-value: 90.8.

EXAMPLE 4

Example 3 is repeated with the following quantities:
5580.0 parts of $H_2O$
407.4 parts of acrylonitrile
12.6 parts of 2-methylidene-1,3-propane diol-bis-acetoacetate
2.5 parts of $K_2S_2O_8$
10.0 parts of $Na_2S_2O_5$
Yield: 81 %
K-value: 80.5.

EXAMPLE 5

Example 3 is repeated with the following quantities:
7440.0 parts of $H_2O$
504.0 parts of acrylonitrile
28.0 parts of acrylic acid methyl ester
28.0 parts of 2-methylidene-1,3-propane diol-bis-acetoacetate
3.5 parts of $K_2S_2O_8$
14.0 parts of $Na_2S_2O_5$
Yield: 82 %
K-value: 78.5.

EXAMPLE 6

20 parts of the polymer of Example 1 are dissolved in 80 parts of dimethyl formamide.
  (a) 0.1 g of $NH_4Cl$ + 0.45 g of terephthalic dialdehyde, or
  (b) 0.1 g of $NH_4Cl$ + 0.4 g of dimethylol urea, or
  (c) 0.1 g of $NH_4Cl$ + 0.25 g of hexamethylene tetramine,
are added to the resulting solution. Films drawn from this solution and tempered for 30 minutes at 120° C are completely insoluble in dimethyl formamide.

EXAMPLE 7

20 parts of the polymer of Example 1 are dissolved in 80 parts of dimethyl formamide.
  (a) 0.25 g of hexamethylene tetramine, or
  (b) 0.05 g of hexamethylene tetramine, or
  (c) 1.20 g of the sodium salt of 3-sulphoisobutyraldehyde,
are added to this solution. Films drawn from this solution and tempered for 10 minutes at 120° C are insoluble in dimethyl formamide.

EXAMPLE 8

The polymer of Example 2 is dissolved in dimethyl formamide to form a 20 % solution which is drawn into films. These films were dried at 60° C, boiled with water for 20 minutes and then redried. They were then treated for 20 minutes at 60° C with 5 % aqueous formalin solution and subsequently dried. The films can be crosslinked by tempering for 10 minutes at 160° C. They are insoluble in dimethyl formamide.

EXAMPLE 9

20 parts of the product of Example 3 are dissolved in 80 parts of dimethyl formamide, followed by the addition to the resulting solution of (a) 0.09 parts, or
(b) 0.45 parts, or
(c) 0.90 parts, of N,N'-bis-methoxymethyl adipic acid diamide. The clear solutions are drawn into films which can be crosslinked by tempering for 10 minutes at 120° C.

EXAMPLE 10

The procedure is as in Example 9, except that the product of Example 5 is used.

The films are crosslinked after tempering for 10 minutes at 120° C.

What is claimed is:

1. A copolymer prepared by free radical polymerization comprising at least 40% by weight of copolymerised acrylonitrile and from 0.5 to 10% by weight of at least one copolymerised unsaturated ester of acetoacetic acid corresponding to the general formula:

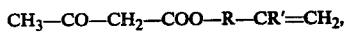

in which
R represents an alkylene radical with from 1 to 4 carbon atoms, and
R' represents a hydrogen atom, an alkyl radical with 1 or 2 carbon atoms or the radical

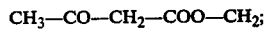

0–10% by weight of at least one comonomer selected from the group consisting of acrylic acid and methacrylic acid alkyl ester; and 0–3% by weight of methallyl sulfonic, vinyl sulfonic acid, or styrene sulfonic acid.

2. The copolymer of claim 1, wherein said copolymerised unsaturated ester of acetoacetic acid corresponds to the general formula:

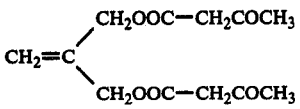

3. A process for the production by free radical polymerization of a copolymer of acrylonitrile and one or more other comonomers, which comprises copolymerising at least 40% by weight of acrylonitrile with from 0.5 to 10% by weight of at least one copolymerisable unsaturated ester of acetoacetic acid corresponding to the general formula:

in which
R represents an alkylene radical with from 1 to 4 carbon atoms, and
R' represents a hydrogen atom, an alkyl radical with 1 or 2 carbon atoms or the radical

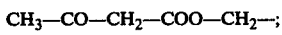

0–10% by weight of at least one comonomer selected from the group consisting of acrylic acid and methacrylic acid alkyl ester; and 0–3% by weight of methallyl sulfonic acid, vinyl sulfonic acid, or styrene sulfonic acid.

* * * * *